US006176467B1

(12) United States Patent
Yamashita et al.

(10) Patent No.: US 6,176,467 B1
(45) Date of Patent: Jan. 23, 2001

(54) CONTROL VALVE DEVICE

(75) Inventors: Shuji Yamashita; Teruhiko Moriguchi; Takeshi Sugiyama, all of Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 08/833,134

(22) Filed: Apr. 4, 1997

(30) Foreign Application Priority Data

Oct. 1, 1996 (JP) ........ 8-260535

(51) Int. Cl.[7] ........ F16K 1/22
(52) U.S. Cl. ........ 251/305; 123/337
(58) Field of Search ........ 251/305, 306; 123/337, 403

(56) References Cited

U.S. PATENT DOCUMENTS

| | | | | |
|---|---|---|---|---|
| 3,356,336 | * | 12/1967 | Maenaka | 251/306 |
| 3,627,261 | * | 12/1971 | Ludeman | 251/305 |
| 4,333,429 | * | 6/1982 | Iiyama et al. | 251/305 X |
| 4,344,396 | * | 8/1982 | Yamada | 123/337 |
| 4,491,106 | * | 1/1985 | Morris | 123/337 |
| 4,836,163 | | 6/1989 | Muschalik . | |
| 5,081,972 | * | 1/1992 | Daly et al. | 123/337 |
| 5,146,887 | * | 9/1992 | Gluchowski et al. | 123/337 |
| 5,181,492 | * | 1/1993 | Sausner et al. | 123/337 |
| 5,669,350 | | 9/1997 | Altmann et al. . | |

FOREIGN PATENT DOCUMENTS

| | | | | |
|---|---|---|---|---|
| 36 43 948 | | 6/1988 | (DE) . | |
| 43 29 527 | | 3/1995 | (DE) . | |
| 0 494 344 | * | 7/1992 | (EP) | 123/337 |
| 7-42870 | | 5/1995 | (JP) . | |

* cited by examiner

*Primary Examiner*—John Fox
(74) *Attorney, Agent, or Firm*—Sughrue, Mion, Zinn, Macpeak & Seas, PLLC

(57) ABSTRACT

A portion of a throttle valve at which the throttle valve is fixed on a throttle valve shaft is formed as a thick portion, and the throttle valve has an outer peripheral portion of at least one of an internal combustion engine side and an air intake side formed with a gradually thinned portion which is formed so as to be gradually thinned toward an intake pipe wall than the thick portion.

3 Claims, 7 Drawing Sheets

FIGURE 5(a)
PRIOR ART
FIGURE 5(b)
AIR INTAKE SIDE
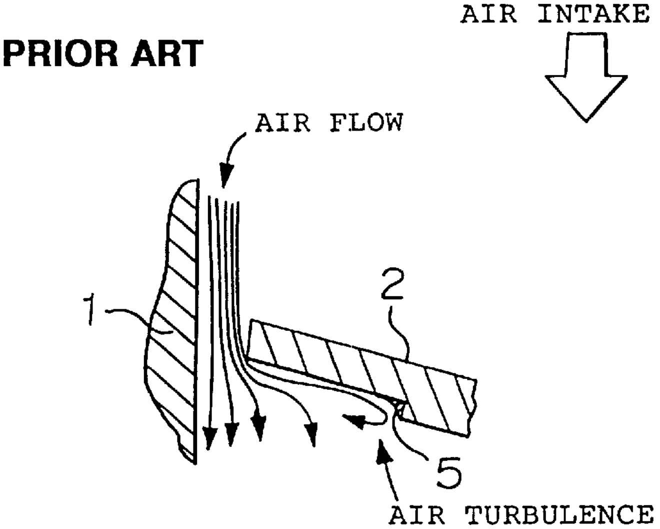
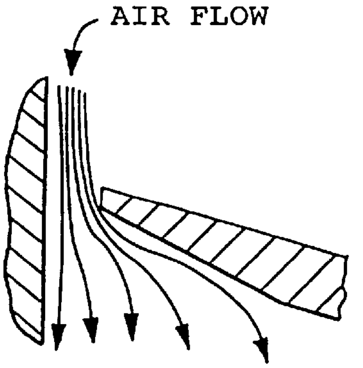
FIGURE 5(c)
PRIOR ART
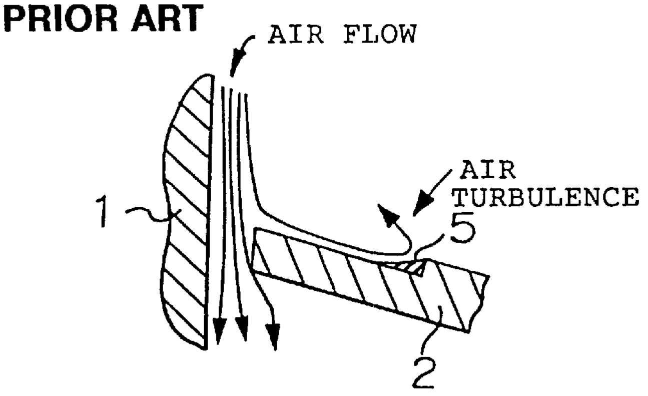
FIGURE 5(d)
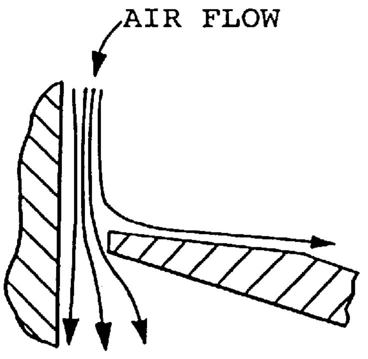
INTERNAL COMBUSTION ENGINE SIDE

PRIOR ART

FIGURE 7 (a) PRIOR ART
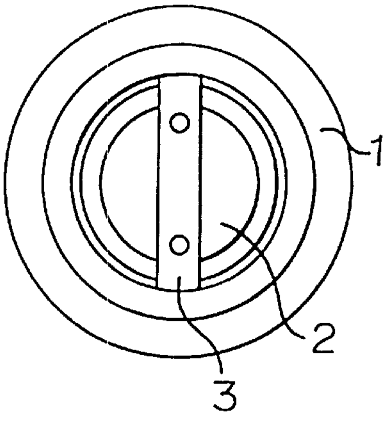
FIGURE 7 (c)
PRIOR ART
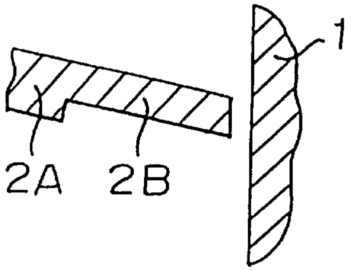
FIGURE 7 (b)
PRIOR ART
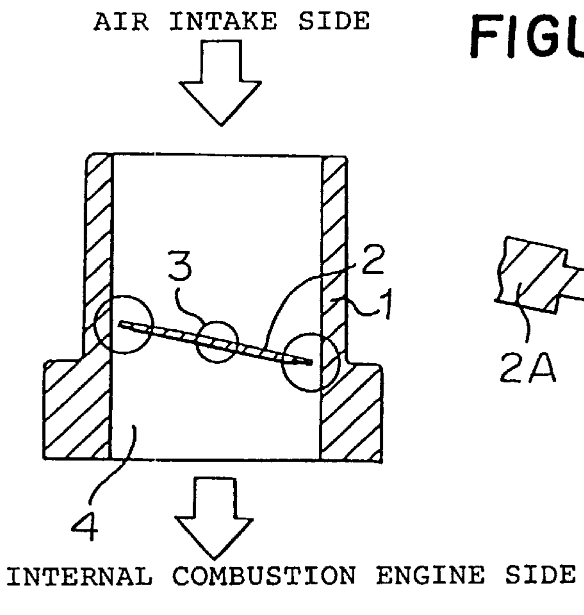
FIGURE 7 (d)
PRIOR ART
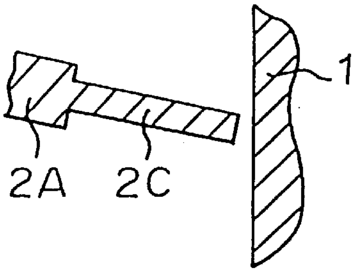

CONTROL VALVE DEVICE

BACKGROUND OF THE INVENTION

1. Field of the Invention

The present invention relates to the structure of a throttle valve for a control valve device which adjusts the amount of intake air for an internal combustion engine.

2. Discussion of Background

In FIG. 6, there is shown a conventional control valve device which adjusts the amount of intake air for an internal combustion engine, and which is depicted as a plan view in FIG. 6(*a*) and as a vertical sectional view in FIG. 6(*b*), and has a portion in the vicinity of a throttle body wall 1 and a peripheral portion of a throttle valve 2 depicted as an enlarged view in FIG. 6(*c*). In the control valve device, an intake air passage 4 is formed for air flow. The throttle body wall 1 which has the intake air passage 4 formed therein has a throttle valve shaft 3 rotatably carried thereon. The throttle valve 2, which is formed in a plate-like shape, is fixed on the throttle valve shaft 3 so as to be freely rotatable. The throttle valve 2 is rotated by the throttle valve shaft 3 operated by an acceleration pedal to provide a mechanism for adjusting the amount of intake air for the internal combustion engine.

In the control valve device, air, the amount of which is regulated by the position of the throttle valve 2, is mixed with fuel when operating the engine, and the mixture is forwarded into the engine. At that time, an exhaust gas or a blow-by gas including carbon and oil sometimes flows toward the side of the throttle valve 2 from the side of the engine. When the throttle valve 2 is nearly shut or the gap between the throttle valve and the throttle valve wall 1 is small, an outer peripheral portion of the throttle valve 2 which confronts the throttle body wall 1 has the carbon or oil deposited thereon. It can be solidified to prevent the throttle valve 2 from properly.

In particular, the latest trend in internal combustion engines is to decrease the setting angle of the throttle valve 2 for idling in order to lower the idling spend. Such decrease in the setting angle of the throttle valve for idling introduces easy adherence of the deposit such as carbon or oil on the outer peripheral portion of the throttle valve. The deposit is solidified by e.g. heat from the internal combustion engine to become a solid deposit 5. Further, additional oil or carbon is liable to adhere on the solid deposit 5, accelerating of deposition of the solid deposit 5.

As stated, when the intake air reflows into the control valve device from the internal combustion engine, the deposit such as carbon in the exhaust gas or oil in the blow-by gas adheres and is deposited on the outer peripheral portion of the throttle valve 2, and is solidified thereon. Such a state causes malfunction in the control valve device. In order to avoid such a state, there has been proposed e.g. a solution which is disclosed in JP-B-7-42870.

In FIG. 7, there is shown the control valve device disclosed in JP-B-7-42870. As shown in FIGS. 7(*c*) and (*d*), the throttle valve 2 is constituted by a thicker portion 2A at which the throttle valve is fixed on the throttle valve shaft 3, and a thinner portion 2B or 2C at the outer peripheral portion of the throttle valve 2. The thinner portion is formed to be stepwise thinner than the thicker portion 2A. In detail, the thickness of at least the outer peripheral portion of the throttle valve 2 becomes stepwise thinner to decrease the thickness of the portion of the throttle valve 2 confronting the throttle body wall 1 so as to lower the adherence amount of the deposit on that portion, allowing the malfunction in the throttle valve 2 to be prevented.

The conventional control valve device for adjusting the amount of intake air for an internal combustion engine, generally, has the throttle valve formed to have a constant thickness as shown in FIG. 6. When the intake air reflows into the control valve device from the engine, the deposit such as carbon in the exhaust gas or oil in the blow-by gas adheres and is deposited on the outer peripheral portion of the throttle valve 2, and is solidified thereon. In order to cope with this problem, forming the throttle valve so as to be stepwise thinner as shown in FIG. 7 has been proposed by JP-B-7-42870. However, when the throttle valve 2 is formed to be stepwise thinned, the presence of the discontinuous stepwise shape of the throttle valve causes the deposit to accumulate at a stepped corner easily and the flow of air passing through the intake passage 4 to be unstable, contributing e.g. wind noise.

SUMMARY OF THE INVENTION

It is an object of the present invention to solve the problems stated earlier, and to provide a control valve device capable of making air flow in an intake passage much smoother while a throttle valve is prevented from malfunctioning due to the presence of a solid deposit produced from carbon or oil. According to a first aspect of the present invention, there is provided a control valve device which comprises a fluid passage (intake air passage) formed in a throttle valve body wall (intake pipe wall), a throttle valve shaft arranged in the fluid passage and rotatably supported by the throttle body wall, and a plate-like throttle valve fixed on the throttle valve shaft and arranged in the plate passage, wherein the throttle valve has a circumferential portion or a portion thereon of at least one of a downstream side (internal combustion engine side) and an upstream side (air intake side) formed to be gradually thinner toward the throttle body wall, thereby making air flow in the intake pipe wall much smoother to prevent the throttle valve from being seized by a deposit or the deposit from accumulating. Wind noise can be also decreased.

According to a second aspect of the present invention, the throttle valve has an outer peripheral end rounded.

According to a third aspect of the present invention, the throttle valve is prepared by pressing.

According to the first aspect, the presence of the gradually thinned portion at the entire circumferential portion or a portion thereof of the throttle valve prevents the air flow from being disturbed at a stepped corner and a solid deposit from accumulating at the stepped corner unlike the conventional device. As a result, the air flow in the throttle body wall can be smoothly carried out, offering advantages in that the solid deposit is prevented from seizing the throttle valve or from accumulating, and that wind noise lowers.

A portion of the throttle valve which confronts the throttle body wall is thinned to decrease a surface area of the confronting portion of the throttle valve, allowing the amount of deposit and a fixing force of the solid deposition to be decreased.

Since a portion of the throttle valve at which the throttle valve is fixed on the throttle valve shaft can be thick, fixing strength required for the throttle valve is ensured.

According to the second aspect, by rounding the outer peripheral end of the throttle valve, air flow at the portion of the throttle valve which confronts the intake pipe wall can be much smoother, and the adherence amount and the fixing force of the solid deposit can be further decreased.

According to the third embodiment, preparation of the throttle valve by pressing can realize mass production and save cost.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5(*a*) and (*c*), and FIGS. 5(*b*) and (*d*) are enlarged sectional view to represent comparison between a conventional control valve device and the control valve device according to the first embodiment in terms of air flow and accumulation of a solid deposit;

FIGS. 7(*a*)–(*d*) are a plan view and a vertical sectional view of the control valve device disclosed in JP-B-7-42870, and enlarged sectional views of the outer peripheral portion of the throttle valve and the intake pipe wall therein.

DESCRIPTION OF THE PREFERRED EMBODIMENTS

Embodiment 1

Figure 1:
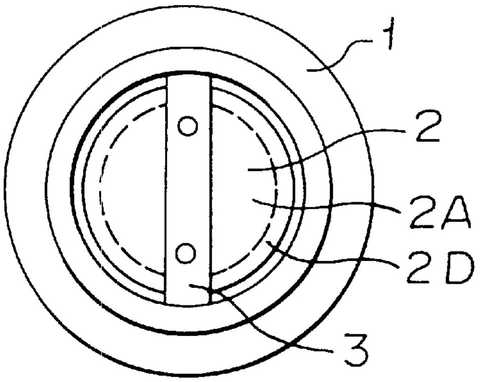
FIGS. 1(*a*)–(*c*) are a plan view and a vertical sectional view of a control valve device according to a first embodiment of the present invention, and an enlarged sectional view of an outer peripheral portion of a throttle valve and an intake pipe wall in the device.
Figure 1:
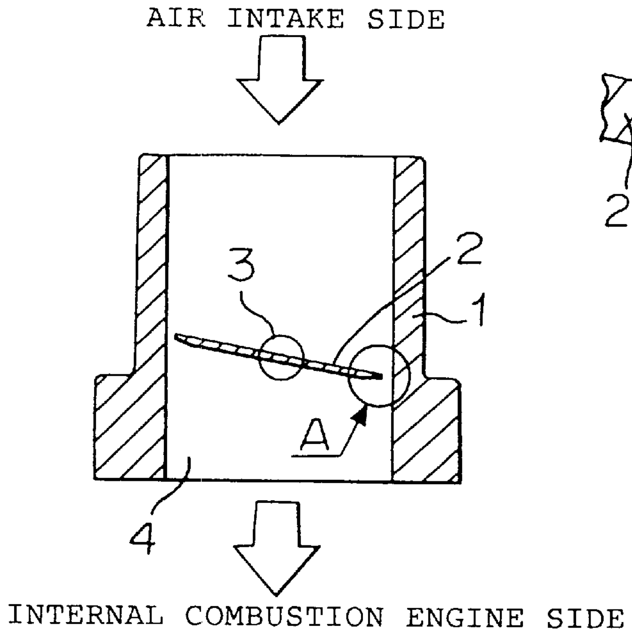
Figure 1:
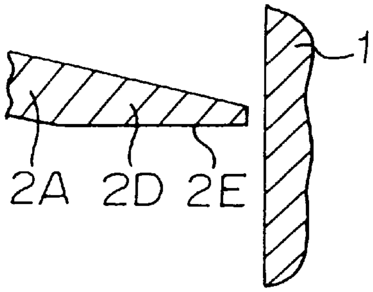
Figure 2:
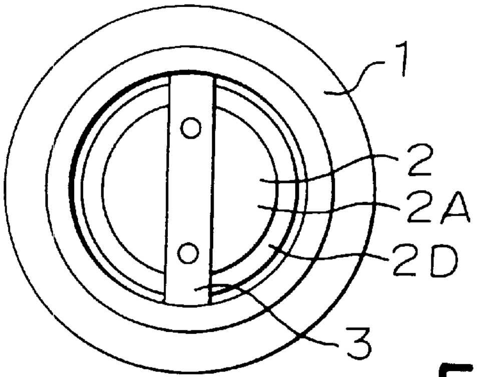
FIGS. 2(*a*)–(*c*) are a plan view and a vertical sectional view of another control valve device according to the first embodiment, and an enlarged sectional view of an outer peripheral portion of a throttle valve and an intake pipe wall in the device.
Figure 2:
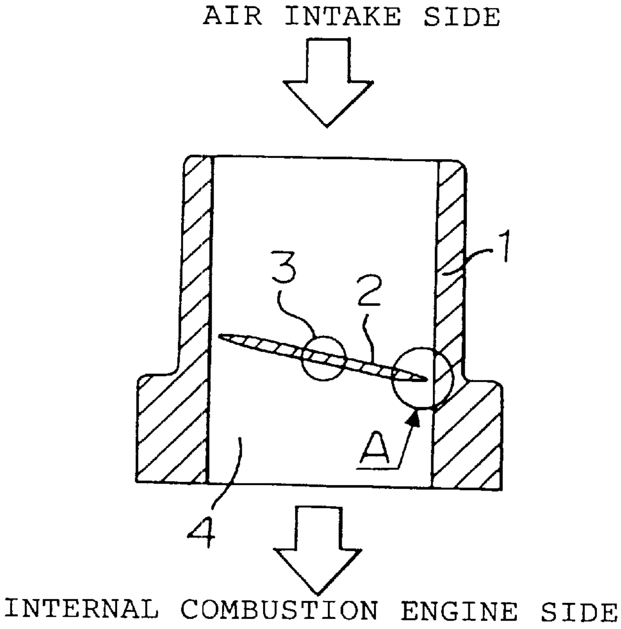
Figure 2:
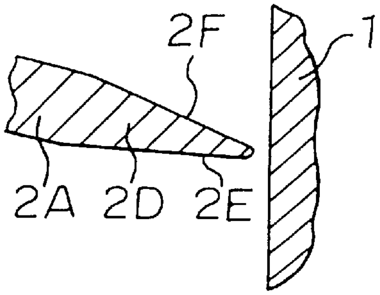
Figure 3:
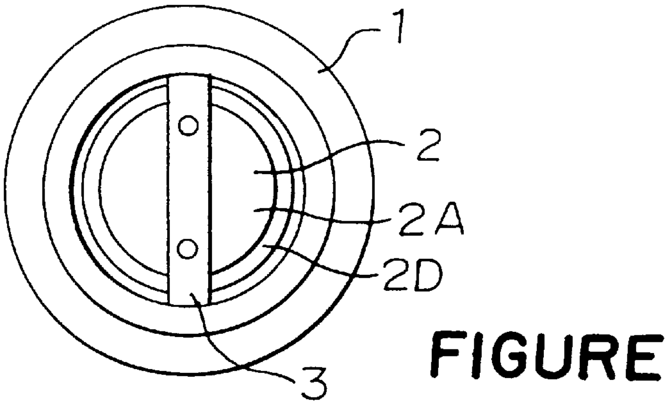
FIGS. 3(*a*)–(*c*) are a plan view and a vertical sectional view of another control valve device according to the first embodiment, and an enlarged sectional view of an outer peripheral portion of a throttle valve and an intake pipe wall in the device.
Figure 3:
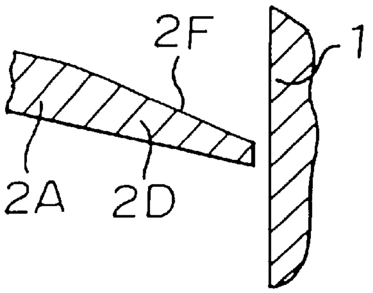
Figure 3:
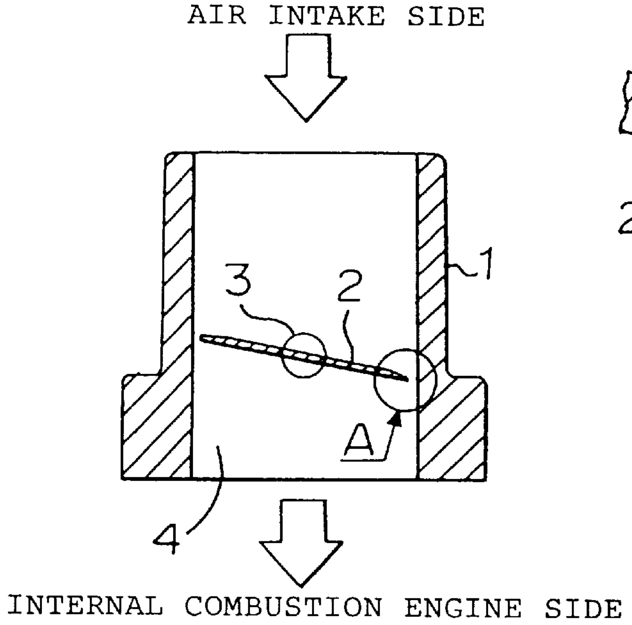

In FIGS. 1–3, there is shown a control valve device according to a first embodiment of the present invention, and which is depicted as a plan view in FIG. 1(*a*) and a vertical sectional view in FIG. 1(*b*), and has an outer peripherential portion of a throttle valve 2 and an intake pipe wall 1 depicted as an enlarged sectional view in FIG. 1(*c*).

In accordance with the first embodiment, a portion of the throttle valve 2 at which the throttle valve is fixed on a throttle valve shaft 3 is formed as a thick portion 2A. The throttle valve has the entire circumferential portion or a portion thereof on one of an internal combustion engine side or an air intake side formed with a gradually thinned portion 2D, which is formed to be gradually thinner toward the intake pipe wall than the thick portion.

Specifically, in FIG. 1, the throttle valve 2, which is formed in a plate-like shape, has the internal combustion engine side surface tapered as indicated by reference 2E to provide the gradually thinned portion 2D at the outer peripheral portion. In FIG. 2, the plate-like throttle valve 2 has both surfaces on the internal combustion engine side and the air intake side tapered as indicated by reference 2E and 2F to provide the gradually thinned portion 2D. In FIG. 3, the plate-like throttle valve 2 has the surface on the air intake side tapered as indicated by reference 2F to provide the gradually thinned portion 2D.

According to the first embodiment, the throttle valve 2 can have the entire outer circumferential portion or a portion thereof formed with the gradually thinned portion 2D to obtain smooth air flow in the intake pipe wall 1. For example, when the throttle valve 2 has a stepped portion on the internal combustion engine side as shown in FIG. 5(*a*), the air which has passed through the throttle valve 2 collides against the stepped portion to create air turbulence such as an eddy. On the other hand, when the throttle valve has the internal combustion engine side formed with the gradually thinned portion 2D as shown in FIG. 5(*b*), the air is smoothly introduced. Although air turbulence is generated when the throttle valve 2 has the air intake side formed with the stepped portion as shown in FIG. 5(*c*), the throttle valve can have the air intake side formed with the gradually thinned portion 2D to make air flow smoother as shown in FIG. 5(*d*).

In addition, in accordance with this embodiment, a solid deposit 5 can be prevented from accumulating at the stepped corner unlike the cases shown in FIGS. 5(*a*) and (*c*).

Further, a portion of the throttle valve 2 which confronts the intake pipe wall 1 is thinned to decrease a surface area of that portion, allowing the adherence amount and the fixing force of the solid deposit 5 to be decreased.

Furthermore, a portion of the throttle valve 2 at which the throttle valve is fixed on the throttle valve shaft 3 is formed as the thick portion 2A, ensuring fixing strength required for the throttle valve 2.

Although in this embodiment there is provided the tapered portion 2E or 2F to obtain the gradually thinned portion 2D at the outer peripherential portion of the throttle valve 2, the throttle valve may be curved so that the throttle valve becomes gradually thinner toward the intake pipe wall from the thick portion 2A.

Embodiment 2

Figure 4:
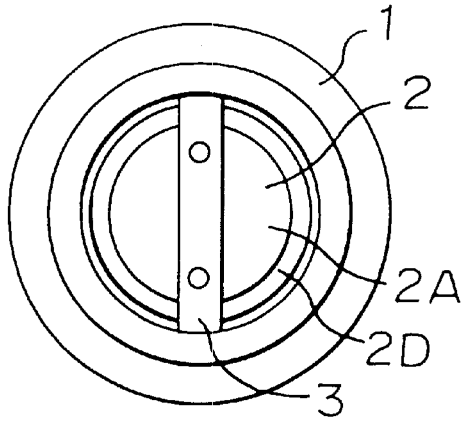
FIGS. 4(*a*)–(*c*) are a plan view and a vertical sectional view of the control valve device according to a second embodiment, and an enlarged sectional view of an outer peripheral portion of a throttle valve and an intake pipe wall in the device.
Figure 4:
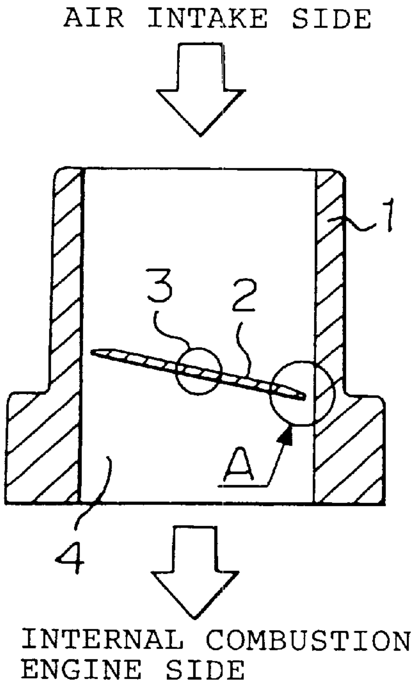
Figure 4:
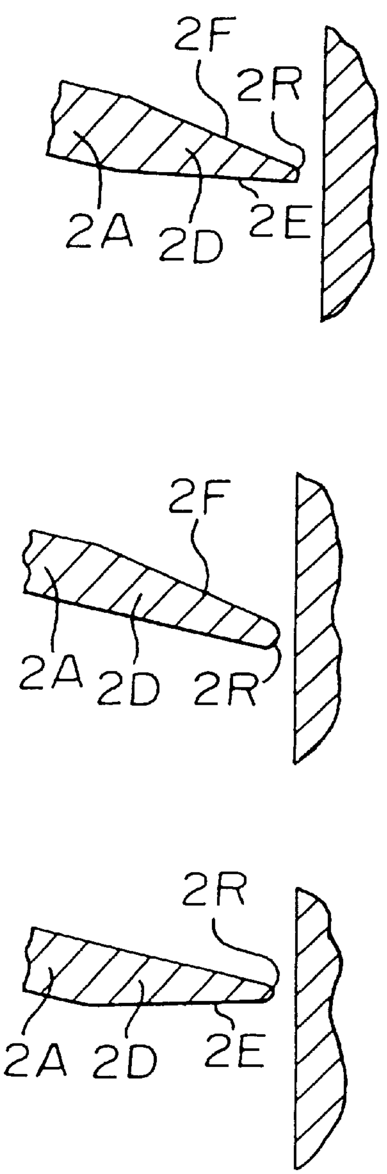
Figure 6A:
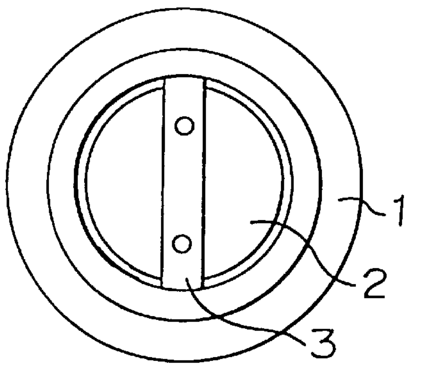
FIGURE 6(a) PRIOR ART
FIGS. 6(*a*)–(*c*) are a plan view and a vertical sectional view of a conventional control valve device, and an enlarged sectional view of an outer peripheral portion of a throttle valve and an intake pipe wall in the device.
Figure 6B:
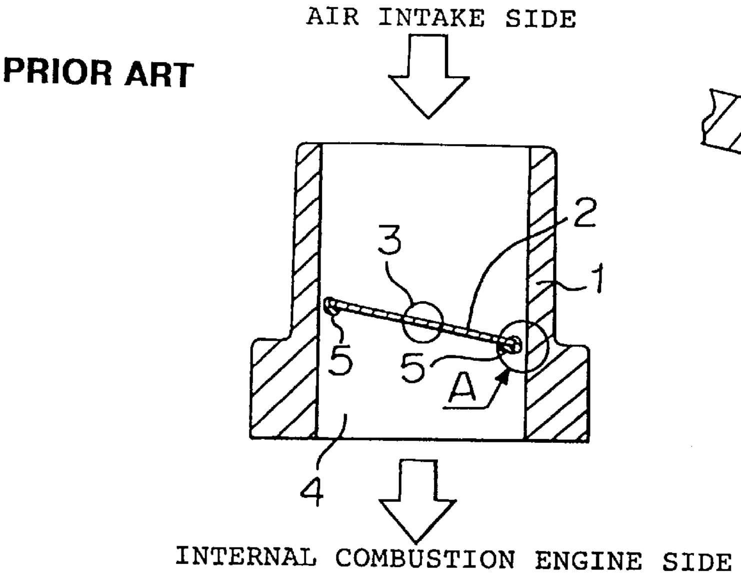
FIGURE 6(b) PRIOR ART
Figure 6C:
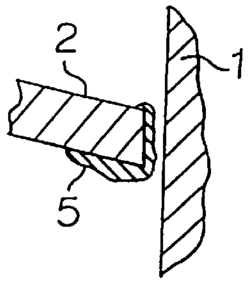

In FIG. 4, there is shown the control valve device according to a second embodiment of the present invention. In the second embodiment, the throttle valve which is formed in accordance with the first embodiment has an outer peripheral end rounded as indicated by reference 2R. That is to say, the gradually thinned portion 2D which is formed at the outer peripherential portion of the throttle valve 2 as shown in FIGS. 1–3 has the outer end rounded as indicated the reference 2R in FIG. 4(*c*).

In accordance with the second embodiment, not only the air flow at the portion of the throttle valve 2 which confronts the intake pipe wall 1 can become much smoother, but also the adherence amount and the fixing force of the solid deposit 5 can be decreased.

Other Embodiments

Although the throttle valve 2 according to the embodiments stated earlier can be prepared by cutting or grinding, it is preferable to prepare the throttle valve by pressing for mass production.

When at least the surface of the portion 2D of the throttle valve 2 is gradually thinned, the portion of the throttle valve which confronts the intake pipe wall 2 around the outer peripheral portion can be coated with an adherence preventing film to avoid adherence of oil or carbon, in particular be chromeplated to prevent the solid deposit 5 from adhering more effectively.

Obviously, numerous modifications and variations of the present invention are possible in light of the above teachings. It is therefore to be understood that within the scope of the appended claims, the invention may be practiced otherwise than as specifically described herein.

What is claimed is:

1. A throttle control valve for installation in an air intake passage of an internal combustion engine, said throttle valve comprising:

a) means (1) defining a cylindrical air intake passage of an internal combustion engine;

b) a rotatably supported valve shaft (3) extending transversely across the passage;

c) a disc-shaped throttle valve (2) fixed to the shaft, rotatable therewith, and disposed in the passage for controlling the amount of combustion air flowing through the passage; and d) means for preventing a buildup of solid deposits from carbon or oil on an outer peripheral edge of the throttle valve, the preventing means comprising a smooth and gradual decrease in the thickness of the valve from a point substantially radially inward of the outer edge and extending continuously outward to the outer edge, the decrease in thickness being circular in nature and extending around an entire circumference of the throttle valve, such that the preventing means has a cross section with two tapering line segments that form a portion of a right circular conical profile.

2. A control valve according to claim 1, wherein the throttle valve has a rounded outer peripheral edge.

3. A control valve according to claim 1, wherein the throttle valve is prepared by pressing.

* * * * *